Patented July 27, 1943

2,325,552

UNITED STATES PATENT OFFICE 2,325,552

PROCESS FOR THE PRODUCTION OF POLY-CONDENSATION PRODUCTS CONTAINING NITROGEN

Paul Schlack, Berlin-Treptow, Germany; vested in the Alien Property Custodian

No Drawing. Application June 19, 1940, Serial No. 341,307. In Germany June 12, 1939

4 Claims. (Cl. 260—2)

This invention relates to the manufacture of nitrogenous polycondensation products.

By condensation of diisocyanates with glycols there are obtained high molecular polyurethanes which may be used, if the degree of polymerization is high enough, as starting material for formed structures, for instance fibers. Products of this kind which may be spun are for instance obtained by the reaction of octamethylene diisocyanate with 1,4-butanediol, according to U. S. patent application Ser. No. 239,456, filed November 8, 1938.

Similar products are formed if diurethanes, for instance hexamethylene-bis-carbamic acid diphenyl ester, are caused to react with glycols, for instance decamethylene glycol, according to my U. S. patent application Ser. No. 352,550 (corresponding to the German patent application I. 64,524 IVc/12 o, filed May 6, 1939).

Also polyurethane compounds have already been produced from components, which, besides the urethane-forming groups, contain already amide groups (carbonamide groups, urea groups, sulfon amide groups, sulfamide groups) linked to the C-atoms with the carbonyl group in an open chain or in hetero-cyclic rings, according to my U. S. patent application Ser. No. 358,695 (corresponding to the German patent application I. 64,650 IVc/12 o, filed May 17, 1939).

This invention has as an object the preparation of new and valuable compositions of matter, particularly synthetic fiber-forming materials.

A further object is the preparation of filaments, fibers and ribbons from these materials.

A further object is the manufacture of materials to be used for dye-casting, spraying and pressing of three-dimensional structures.

A further object is the manufacture of synthetic lacquers and waxes.

Still further objects will become apparent from the detailed specification following hereinafter.

It has been found that new and valuable nitrogenous poly-condensation products are obtained, if compounds of carbonic acid with amino alcohols or mercaptans are intermolecularly condensed by heating, said amino alcohols and amino mercaptanes having amino- and hydroxyl- or sulfhydryl-groups (linked to saturated C-atoms) and possessing a chain of at least four C-atoms between the terminal amino nitrogen and the hydroxyl- or mercapto-group, if desired interrupted by hetero-atoms or groupings like O, S, SO, $SO_2$, whereby in said carbonic acid compounds the carbonic acid radical is contained in the form of an N-carboxylic acid-ester radical or -amide radical or an O-ester compound. This is accomplished, if desired, in the presence of solvents or diluents or of catalysts which favour the separation of ammonia or alcohol, especially catalysts adapted for the interchange of ester radicals like potassium-carbonate, magnesium oxide, magnesium methylate, hydrogen halide toluene sulfonic acid, camphor, sulfonic acid zinc chloride, stannous chloride.

Adapted for these condensations are not only the derivatives of simple amino alcohols, for instance derivatives of 4-amino butanol, the 5-amino pentanol, the 4-amino cyclo hexanol, the 4-amino butyl mercaptan (from benzoyl amino butyl chloride and potassium sulfhydrate with following hydrolysis), but also more complicated amino oxy- or amino mercapto compounds, the chain of which may be interrupted by hetero atoms or hetero groups like O, S, $SO_2$, for instance derivatives of the ω-amino butyl, ω'-oxy propyl sulfide (from benzoyl amino butyl mercapton and 3-bromo propanol). There are included especially also such derivatives of amino oxy- or amino mercapto compounds, the chain of which is interrupted by amide groups, for instance by carbonamide groups linked to carbon, urea groups, sulfon amide groups, sulfamide groups. These amide groups may be contained in the open chain as well as in hetero-cyclic nuclei, inserted into the chain, or may be contained in both at the same time, according to my U. S. patent application Ser. No. 358,695 (corresponding to the German patent application I. 64,650 IVc/12, filed May 17, 1939).

A special form of application is the following: amino alcohols or their halides are caused to react with phosgene and the intermediate products are then advantageously heated in the presence of a diluent, whereby further condensation takes place by splitting off hydrogen halide. It is to be presumed that, with regard to the salts, chloroformic acid esters are first formed and then the chloride group reacts with the nitrogen, saturated by hydrogen halide, by splitting off two mols halogen halide. As solvents or diluents for the reaction there are especially suitable halogenated hydrocarbons with a boiling point between 110° and 170° C., for instance tetrachloroethylene, tetrachloroethane, chlorobenzene, o-dichlorobenzene. With regard to the free amines most probably carbamic acid chlorides, besides amine salt, are first formed, which latter reacts secondarily with phosgene, whereas the primary formed carbamic acid chloride is quickly subjected to the intermolecular reaction.

The products obtained according to the present invention may be used according to their properties in many different cases. Typically high molecular substances may be worked up according to the methods known for polyamides directly from the melt, from solutions or in a thermo-plastic process into fibers, ribbons, foils and similar structures. They may be furthermore formed into three-dimensional structures by spraying, dye-casting, pressing. Low polymeric materials for instance may be employed as starting materials for lacquer. Soft products may be used as substitute for wax. High polymeric and middle-high polymeric substances, relatively easily soluble in organic solvents, are adapted for auxiliary agents in the textile and leather industries and related branches of chemical technology, for instance for impregnations or fixations of pigments and dyestuffs.

*Example I*

5-amino pentanol is transformed with chloro formic acid methyl ester into the carbamic acid methyl ester. This urethane is then heated in the presence of ½₀₀ mol potassium carbonate at 140–200° C. until the separation of methanol ceases. The temperature is finally kept for 6 hours in vacuo (0.5 mm.) at 210° C. by simultaneously blowing dry, preheated nitrogen gas over the melt. The reaction product may be drawn into filaments directly from the melt.

*Example II*

N-carboxy methyl-amino capronic acid chloride obtained from the acid with thionyl chloride is caused to react in benzene solution with an aqueous solution of 1.4-amino-butanol in the presence of an alkali while cooling. The urethane thus obtained of the formula

CH₃—O—CO—NH—(CH₂)₅—
CO—NH—(CH₂)₄—OH is condensed with itself by splitting off methanol when heated, especially in the presence of catalysts adapted for the interchange of ester radicals, for instance ½₀₀ mol toluene sulfo acid calculated on one mol urethane. The reaction may be carried out with and without solvents. A suitable solvent is o-dichlorobenzene.

*Example III*

Para-4-amino-cyclohexanol is acylated in benzene with a calculated amount of chloroformic acid phenyl ester into urethane. The benzene is then distilled off and the product heated in the presence of traces of sodium phenolate in dry phenol at 170° C., until the viscosity does not increase any more. The reaction product is then precipitated as powder with acetone. It may be still further polymerized by remelting and reheating the melt in high vacuo.

A similar product is obtained, if the 4-amino-cyclo-hexanol is added to excess oxalic ester in alcohol and transformed into the oxamic acid ester which is heated in a nitrogen atmosphere in the presence of a little sodium alcoholate. The respective oxamic acid may be obtained also by saponification and then condensed.

*Example IV*

Finely powdered 1.4-butanol amine hydrochloride is suspended in chloro benzene. Therein is conducted phosgene at 100–130° C. under excess pressure of 60 mm. Hg while violently stirring, until the development of hydrogen-chloride ceases. The mixture is then caused to boil while phosgene is permanently conducted through it, until hydrogen halide is no more detectable. Part of the diluent is finally distilled off. The reaction product is obtained in the form of a feebly colored powder, which may be still further polymerized by melting and further heating in vacuo.

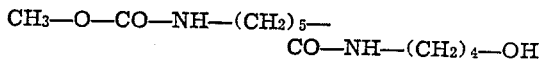

I claim:

1. The process for the production of nitrogenous polycondensation products which comprises condensing intermolecularly by heat compounds obtained by the reaction of a compound selected from the class consisting of chloroformic acid hydrocarbon esters and phosgene with a substance selected from the class consisting of mono-amino mono-alcohols and their halide salts in which the amino- and hydroxyl-groups are terminal groups, and mono-amino mono-mercaptans and their halide salts in which the amino and the mercapto groups are terminal groups, said terminal groups in said substances being separated by a chain of at least 4 carbon atoms, said carbon atoms being saturated.

2. The process for the production of a nitrogenous polycondensation product which comprises condensing intermolecularly by heat the compound obtained by the reaction of 5-amino-pentanol with chloroformic acid methyl ester.

3. The process for the production of a nitrogenous polycondensation product which comprises condensing intermolecularly by heat the compound obtained by the reaction of para-4-amino-cyclohexanol with chloroformic acid phenyl ester.

4. The process for the production of a nitrogenous polycondensation product which comprises condensing intermolecularly by heat the compound obtained by the reaction of 1.4-butanol amine hydrochloride with phosgene.

PAUL SCHLACK.